(12) United States Patent
Lawrence

(10) Patent No.: US 11,031,767 B2
(45) Date of Patent: Jun. 8, 2021

(54) POWER RELAY SYSTEM WITH ARC FLASH INCIDENT ENERGY REDUCTION

(71) Applicant: Florida Power & Light Company, Juno Beach, FL (US)

(72) Inventor: Jon D Lawrence, Merritt Island, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 301 days.

(21) Appl. No.: 16/146,038

(22) Filed: Sep. 28, 2018

(65) Prior Publication Data

US 2020/0106256 A1 Apr. 2, 2020

(51) Int. Cl.
*H02H 1/06* (2006.01)
*H02H 3/093* (2006.01)
*H02H 1/00* (2006.01)

(52) U.S. Cl.
CPC .......... *H02H 1/063* (2013.01); *H02H 3/0935* (2013.01); *H02H 1/0061* (2013.01)

(58) Field of Classification Search
CPC ........ H02H 1/063; H02H 1/06; H02H 1/0061; H02H 3/0935; H02H 3/006; H02H 3/021; H02H 3/04; H02H 3/027; H02H 3/205; H02H 9/04; H02H 9/06
See application file for complete search history.

(56) References Cited

U.S. PATENT DOCUMENTS

| | | | |
|---|---|---|---|
| 4,591,940 A | 5/1986 | Sun et al. | |
| 6,469,629 B1 | 10/2002 | Campbell et al. | |
| 7,570,469 B2 | 8/2009 | Guzman-Casillas et al. | |
| 8,174,268 B2 | 5/2012 | Bose et al. | |
| 8,674,823 B1* | 3/2014 | Contario | G01R 19/145 340/538 |
| 9,343,895 B2 | 5/2016 | Suthar et al. | |
| 10,096,993 B2* | 10/2018 | Taillefer | H02H 9/002 |
| 2006/0007627 A1 | 1/2006 | Lewis | |
| 2010/0254055 A1* | 10/2010 | Vanderzon | H05B 39/04 361/87 |
| 2010/0296215 A1* | 11/2010 | Montenegro | H01H 75/04 361/59 |
| 2011/0012603 A1 | 1/2011 | Bose et al. | |
| 2012/0229939 A1* | 9/2012 | Mikani | G01R 31/1227 361/55 |
| 2013/0261821 A1* | 10/2013 | Lu | G08C 17/02 700/289 |

(Continued)

*Primary Examiner* — Fred E Finch, III
*Assistant Examiner* — Kevin H Sprenger
(74) *Attorney, Agent, or Firm* — Tarolli, Sundheim, Covell & Tummino LLP (57) ABSTRACT

One example includes a power relay system. The system includes a circuit breaker configured, when triggered, to provide an open circuit in a power line configured to conduct a current between a power grid point-of-interconnect (POI) and a power generator system. The system also includes a power controller configured to monitor the current and to generate a dynamic current threshold based on the current, the power controller being further configured to compare the current with the dynamic current threshold and to trigger the circuit breaker based on a difference of the current relative to the dynamic current threshold to set an arc flash incident energy level of the power generator system to less than or equal to a predetermined safety level.

22 Claims, 5 Drawing Sheets

(56) References Cited

U.S. PATENT DOCUMENTS

| | | | |
|---|---|---|---|
| 2014/0153150 A1* | 6/2014 | LePort | H02H 3/006 361/93.8 |
| 2014/0268459 A1* | 9/2014 | Robinson | H02H 3/0935 361/87 |
| 2016/0179164 A1* | 6/2016 | Park | G06F 1/3243 713/322 |

* cited by examiner

POWER RELAY SYSTEM WITH ARC FLASH INCIDENT ENERGY REDUCTION

TECHNICAL FIELD

This disclosure relates generally to generation, transmission and distribution electric systems, and more specifically to a power relay system with arc flash incident energy reduction.

BACKGROUND

Large power generating systems are necessary for distributing power to a public power utility grid for use by individual consumers. A power generating system can include multiple separate power generators or groups of power generators, such as solar panels, wind turbines, or a variety of other fuel-driven turbines (e.g., fossil-fuel or nuclear powered turbines), that are provided to a common point-of-interconnect (POI). A power generating system can include a circuit breaker between the POI and the power generators, such that the circuit breaker can trip to create an open-circuit between the POI and the power generators in response to a fault condition. For example, sensitivity of the power relay system (or lack thereof) to such faults can dictate the level of heavy protective equipment personnel may be required to wear to avoid personal injury.

SUMMARY

One example includes a power relay system. The system includes a circuit breaker configured, when triggered, to provide an open circuit in a power line configured to conduct a current between a power grid point-of-interconnect (POI) and a power generator system. The system also includes a power controller configured to monitor the current and to generate a dynamic current threshold based on the current, the power controller being further configured to compare the current with the dynamic current threshold and to trigger the circuit breaker based on a difference of the current relative to the dynamic current threshold to set an arc flash incident energy level of the power generator system at or below a predetermined safety level.

Another example includes a method for protecting a power generator system. The method includes monitoring a current propagating in a power line between a power grid POI and the power generator system and generating a dynamic current threshold based on the current. The method also includes comparing the current with the dynamic current threshold, and generating a trigger signal to trigger a circuit breaker based on a difference of the current relative to the dynamic current threshold to set an arc flash incident energy level of the power generator system at or below a predetermined safety level.

Another example includes a power relay system. The system includes a circuit breaker configured, when triggered, to provide an open circuit in a power line configured to conduct a current between a power grid point-of-interconnect (POI) and a power generator system. The system also includes a power controller. The power controller includes a current sampler configured to sample the current to generate a plurality of current samples and to generate a cycle current value for each of a plurality of cycles of the current based on the plurality of current samples associated with the respective one of the plurality of cycles. The power controller also includes a current buffer configured to continuously store a predetermined number of cycle current values in a time-wise manner, and an averaging component configured to substantially continuously average the predetermined number of cycle current values to generate a dynamic current threshold. The power controller further includes a current comparator configured to compare the cycle current value associated with at least one of the plurality of cycles with the dynamic current threshold and to trigger the circuit breaker based on an amplitude difference of the cycle current relative to the dynamic current threshold.

DETAILED DESCRIPTION

This disclosure relates generally to the generation, transmission and distribution electric system, and more specifically to a power relay system with arc flash incident energy reduction. The power relay system can detect overcurrent conditions, such as associated with faults, in a power generation system. The power relay system is configured to sample a current in a power line between a power generator system (e.g., a solar cell system or a wind-power system) and a point-of-interconnect (POI) that connects the power generator system to a power grid (e.g., the public utility grid). The power relay system determines a cycle current value corresponding to each given cycle (e.g., AC period) of the current. The power relay system can thus calculate an average of the cycle current values over a predetermined number of cycles of the current. The calculated average current value can thus act as a dynamic current threshold for the power relay system that can change with respect to the calculated average current value over time. Moreover, the power relay system can monitor the current on the power line relative to the dynamic current threshold. In response to the power relay system detecting an amplitude of the current that exceeds the dynamic current threshold, the power relay system can send a trip command to an associated circuit breaker to provide an open circuit in the power line, and can thus cease current flow in the power line.

As an example, the power relay system can compare the cycle current values with the dynamic current threshold in a variety of different ways. For example, the power relay system can compare one or more cycle current values with a programmable threshold difference value relative to the dynamic current threshold, such that if the cycle current value(s) are greater than or less than the dynamic current threshold by greater than the programmable threshold difference value, then the circuit breaker trips. As another example, the power relay system can provide statistical analysis of an aggregation of a sequence of the cycle current values, and can compare the aggregate score with the dynamic current threshold, such as with respect to the programmable threshold difference value, to provide the trip command. As yet another example, the power relay system can analyze the amplitude of the cycle current value(s) relative to the dynamic current threshold over a programmable duration of time (e.g., based on the programmable number of sequential cycle current values) to determine whether to initiate the trip command.

The power relay system can be implemented in solar/renewable energy generation, where troubleshooting power equipment is performed on site. Some solar generation facilities perform incident energy calculations, which can render maintenance on energized equipment difficult based on the variable conditions that can falsely appear as an overcurrent condition. Furthermore, when needed to perform maintenance on power equipment, setting relays to reduce incident energy levels at certain work locations can be based on the power generation facilities having high variability in the amount of current flowing through the breakers. Also, the power generation sites may allow power to flow in both directions through the power line, and the site itself can contribute significantly to the available fault current without being seen by the breaker. Moreover, when troubleshooting the power equipment on the solar generation site, multiple components of solar power equipment (such as inverters) have to be set offline, in order to perform simple maintenance work, resulting in a loss in revenue. Furthermore, maintenance performed by personnel for areas of the power generation system that may not be switched off may require heavy and uncomfortable protective equipment worn by maintenance personnel.

The power relay system identifies conditions in which overcurrent conditions and faults can occur in the power generation facility. Once the power relay system has identified that there are conditions that result in an overcurrent, the power relay system can send a trip command to the breaker to prevent an overcurrent, or to reduce the time duration of a potential arc flash. Minimizing the time duration of arc flashes is beneficial when performing maintenance to render maintenance work more manageable since workers do not have to rely on heavy protective gear to perform the maintenance. Moreover, the benefit of not being required to switch offline an entire power generating system when performing maintenance can result in reduced costs.

Figure 1:
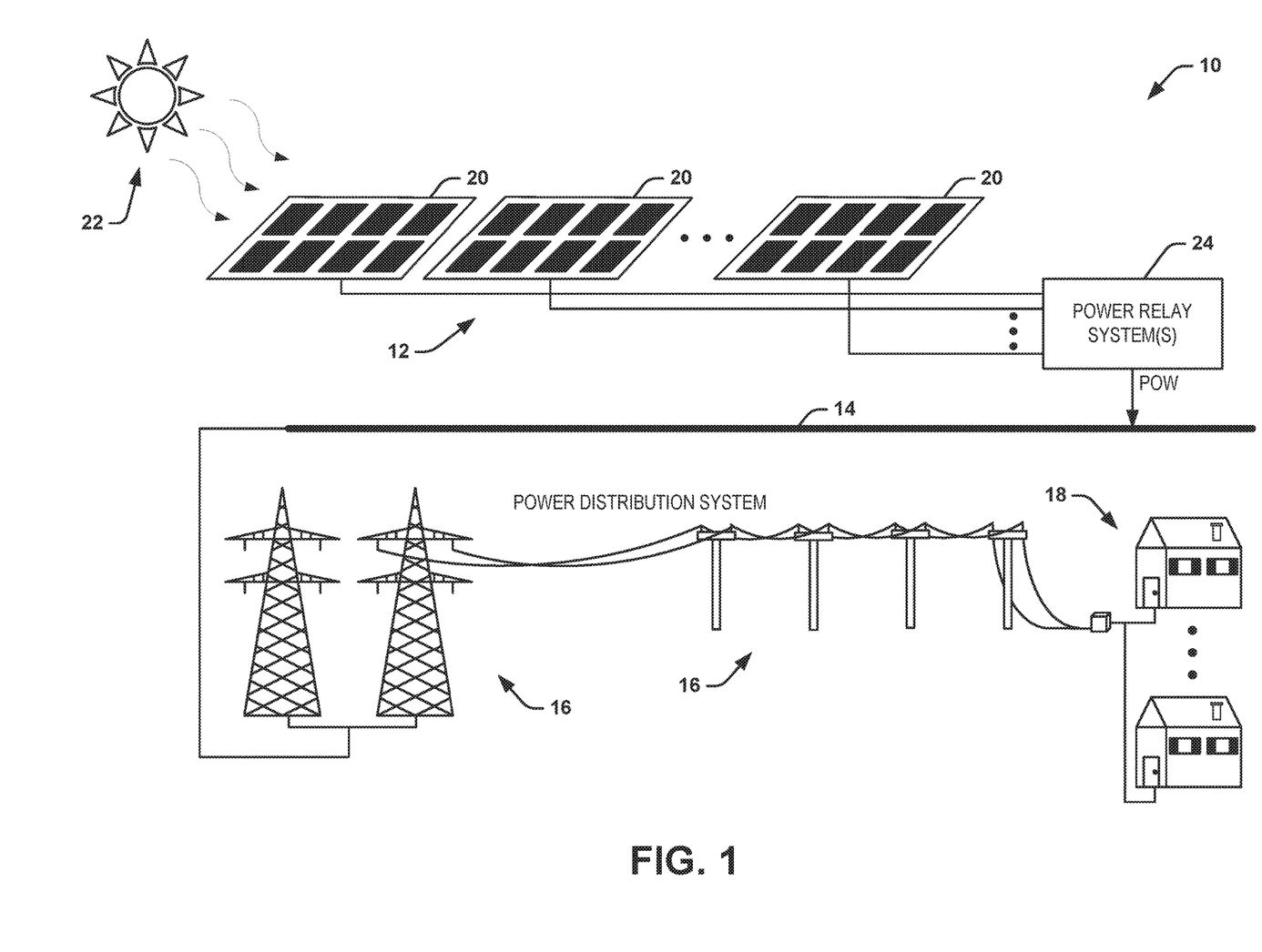
FIG. 1 illustrates an example of a utility power system.

A power relay system can be implemented in any of a variety of utility power systems, such as demonstrated in the example of FIG. 1. FIG. 1 illustrates an example of a utility power system 10. The utility power system 10 includes at least one power generator system 12 that is configured to provide power, demonstrated in the example of FIG. 1 as POW, to a power transmission system 14, which can correspond to a power bus or one or more points-of-interconnect (POIs) that provide power via a power distribution system 16 (e.g., transformers, substations, and power lines) to consumers, demonstrated generally at 18. In the example of FIG. 1, the power generator system(s) 12 are demonstrated as solar power generator system(s) that include sets of solar panels 20 configured to generate the power POW via the Sun, demonstrated at 22. However, it is understood that the power generator system(s) 12, with the functionality as described herein, can instead be arranged as any of a variety of other types of power generation systems, such as fossil-fuel power, wind power, or battery power.

In the example of FIG. 1, the power generator system(s) 12 includes a power relay system 24 that is configured to monitor current between the power transmission system 14 and the respective power generator system(s) 12. As described in greater detail herein, the power relay system 24 can sample the current and can determine a cycle current value corresponding to each given cycle (e.g., AC period) of the current. The power relay system 24 can thus calculate an average of the cycle current values over a predetermined number of cycles of the current. The calculated average current value can thus act as a dynamic current threshold for the power relay system that can change with respect to the calculated average current value over time. The power relay system 24 can monitor the current on the power line relative to the dynamic current threshold to detect an overcurrent condition or fault condition (e.g., including arc fault conditions) in one of the power generators of the respective power generator system(s) 12. In response to the power relay system 24 detecting an amplitude of the current that exceeds the dynamic current threshold, such as based on one or more programmable characteristics, the power relay system 24 can send a trip command to an associated circuit breaker to provide an open circuit in the power line, and can thus cease current flow in the power line.

Figure 2:
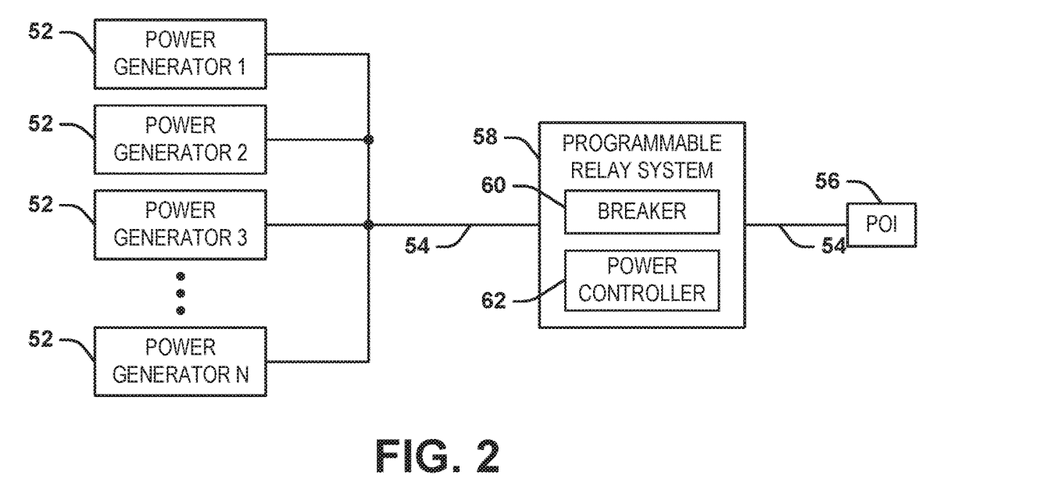
FIG. 2 illustrates an example of a power generator system.

FIG. 2 illustrates an example of a power generator system 50. The power generator system 50 can correspond to any of a variety of power generator system types, such as fossil-fuel, solar power, wind power, or any of a variety of other types of power generator systems. The power generator system 50 can correspond to one of the power generator system(s) 12 in the example of FIG. 1. Therefore, reference is to be made to the example of FIG. 1 in the following description of the example of FIG. 2.

The power generator system 50 includes a plurality N of power generators 52, demonstrated as "POWER GENERATOR 1" through "POWER GENERATOR N", where N is a positive integer. The power generators 52 can each correspond to one or more power generating elements, such as one or more solar panels, one or more wind turbines, or one or more driven turbines (e.g., fossil-fuel or nuclear powered), that are configured to conduct current $I_{PWR}$ to a power line 54. The current $I_{PWR}$ can be provided on the power line 54 to a POI 56, such that the current $I_{PWR}$ can be provided to the public power utility grid as power to be consumed by power customers. As an example, the power generators 52 can each also include additional supporting equipment, such as inverters (e.g., for solar power generators), transformers, and/or other equipment (e.g., enclosures).

In the example of FIG. 2, the power generator system 50 includes a power relay system 58 that is demonstrated as coupled to the power line 54. It is to be understood that the power line 54 can be provided as multiple separate conductors, such that the power relay system 58 can interconnect separate portions of the power line 54. The power relay system 58 can be configured to protect the power generators 52, and thus the power generator system 50 as a whole, from overcurrent conditions and/or from fault conditions (e.g., including arc fault conditions), as described in greater detail herein. The power relay system 58 includes a circuit breaker 60 that is configured to provide an open circuit in the power line 54 in response to being triggered. The power relay system 58 also includes a power controller 62 configured to sample the current $I_{PWR}$ to generate a cycle current value at each of a plurality of cycles of the current $I_{PWR}$. The power controller 62 can thus generate a dynamic current threshold based on the current cycle values, as described in greater detail herein. As an example, the dynamic current threshold can be generated based on continuously averaging the cycle current values from sequential cycles of the current $I_{PWR}$. The power controller 62 can further be configured to compare the current $I_{PWR}$ with the dynamic current threshold, such that the power controller 62 can trigger the circuit breaker 60 based on an amplitude of the current $I_{PWR}$ relative to the dynamic current threshold.

Figure 3:
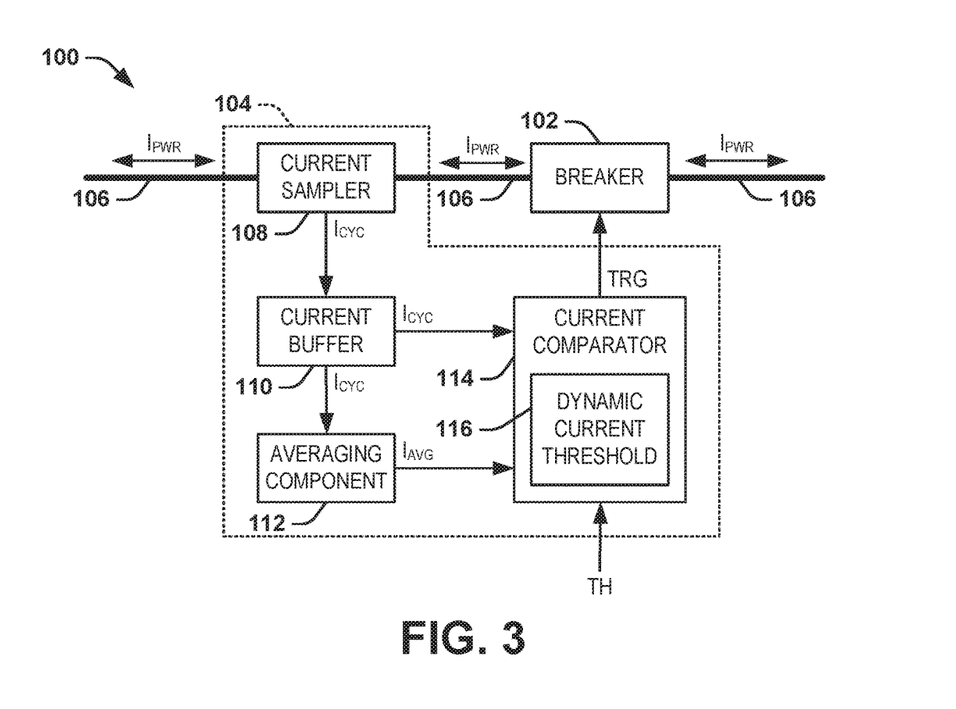
FIG. 3 illustrates an example of a power relay system.

FIG. 3 illustrates an example of a power relay system 100. The power relay system 100 can correspond to the power relay system 58 in the example of FIG. 2 or the power relay system 24 in the example of FIG. 1. Therefore, reference is to be made to the examples of FIGS. 1 and 2 in the following description of the example of FIG. 3.

The power relay system 100 includes a circuit breaker 102 and a power controller 104. The circuit breaker 102 is demonstrated as interconnecting portions of a power line 106 on which the current $I_{PWR}$ propagates. As described in greater detail herein, the current $I_{PWR}$ is demonstrated as bidirectional, such that the power relay system 100 can protect the associated power generator system from overcurrent and/or fault conditions (e.g., including arc fault conditions) based on different directions of the current $I_{PWR}$. Thus, in response to being triggered in response to a trigger signal TRG, the circuit breaker 102 can provide an open circuit condition for the power line 106, thus ceasing flow of the current $I_{PWR}$ in the power line 106.

The power controller 104 can be configured to implement a power protection algorithm to monitor the current $I_{PWR}$ and to provide the trigger signal TRG in response to an indication of an overcurrent condition or a fault condition (e.g., including arc fault conditions). The power controller 104 includes a current sampler 108 that is coupled to the power line 106. The current sampler 108 is thus configured to sample the current $I_{PWR}$ at a predetermined sampling rate (e.g., sixteen samples per period of the current $I_{PWR}$). The current sampler 108 can thus generate a current cycle value $I_{CYC}$ corresponding to a current amplitude for the respective cycle of the current $I_{PWR}$. The cycle current value $I_{CYC}$ can correspond to a type of amplitude representation, such as peak, peak-to-peak, or root-mean-square (RMS) current amplitude of the current $I_{PWR}$.

The current sampler 108 can provide the cycle current value $I_{CYC}$ to a current buffer 110 that is configured to store the cycle current value of each of a sequence of cycles of the current $I_{PWR}$, and thus a predetermined number of sequential cycle current values $I_{CYC}$. As an example, the predetermined number of the sequential cycle current values $I_{CYC}$ can be programmable based on the specific characteristics of the power generator system 50. The current buffer 110 can store a number of sequential cycle current values $I_{CYC}$ that can correspond to a variety of operational features of the power relay system 100, as described in greater detail herein. Therefore, the programmable aspect of the predetermined number of the sequential cycle current values $I_{CYC}$ can be based on a variety of desired operational characteristics of the power relay system 100.

The power controller 104 can also include an averaging component 112 that is configured to generate an average current value $I_{AVG}$ corresponding to an average of a plurality of cycle current values $I_{CYC}$. As an example, the averaging component 112 can substantially continuously generate an average of the plurality of cycle current values $I_{CYC}$, such as a subset (e.g., all) of the predetermined number of the sequential cycle current values $I_{CYC}$ in the current buffer 110. Alternatively, the averaging component 112 can generate an average of each consecutive set of the cycle current values $I_{CYC}$ in the current buffer over a given interval of time. As yet another example, the averaging component 112 can receive the current samples of the current $I_{PWR}$, such that the averaging component 112 can generate the average current value $I_{AVG}$ based on the digital samples directly. The averaging component 112 can provide the average current value $I_{AVG}$ to a current comparator 114, such that the current comparator 114 can generate a dynamic current threshold 116 based on the average current value $I_{AVG}$. As an example, the dynamic current threshold 116 can correspond directly to the average current value $I_{AVG}$, or can correspond to an adjusted version of the average current value $I_{AVG}$ (e.g., based on an offset value).

In the example of FIG. 3, the current buffer 110 also provides one or more of the cycle current values $I_{CYC}$ to the current comparator 114. The current comparator 114 can thus analyze the cycle current value(s) $I_{CYC}$ relative to the dynamic current threshold 116 to determine the occurrence of an overcurrent condition or a fault condition (e.g., including arc fault conditions). In response to detecting the overcurrent condition or the arc fault condition based on the cycle current value(s) $I_{CYC}$ relative to the dynamic current threshold 116, the current comparator 114 can provide the trigger signal TRG to the circuit breaker 102. As a result, the circuit breaker 102 can provide an open circuit in the power line 106 to cease flow of the current $I_{PWR}$ in the power line 106.

The current comparator 114 can be configured to provide the trigger signal TRG based on any of a variety of conditions that can be indicative of an overcurrent or a fault condition (e.g., including arc fault conditions). In the example of FIG. 3, the current comparator 114 can be provided one or more programmable thresholds, demonstrated as a signal TH provided to the current comparator 114. As an example, the current comparator 114 can compare a single cycle current value $I_{CYC}$ with a programmable current difference threshold (e.g., provided via the signal TH) relative to the dynamic current threshold 116. Therefore, in response to single cycle current value $I_{CYC}$ having an amplitude that is greater than or less than the dynamic current threshold 116 by the programmable current difference threshold, the current comparator 114 can provide the trigger signal TRG. Based on comparing a single cycle current value $I_{CYC}$ to the dynamic current threshold 116, the current comparator 114 can provide the trigger signal TRG very rapidly (e.g., within 0.02 seconds), such that the circuit breaker 102 can provide the open circuit very rapidly (e.g., within 0.05 seconds) in response to the trigger signal TRG. As a result, as described in greater detail herein, the power relay system 100 can provide for a significantly reduced arc flash incident energy (e.g., less than 10 calories/cm$^2$) based on the substantially reduced duration of time of current associated with the arc flash event.

As another example, the signal TH can also include a programmable threshold associated with a dynamic baseline current associated with the comparison. For example, the current comparator 114 can be configured to provide the trigger signal TRG in response to a plurality of cycle current values $I_{CYC}$ being greater than or less than the dynamic current threshold 116, such as by the programmable difference current threshold, for the programmable current threshold. The programmable difference current threshold can, for example, correspond to a predetermined number of sequential cycle current values $I_{CYC}$ (e.g., cycle current values $I_{CYC}$ in each of sequential cycles of the current $I_{PWR}$), as stored in the current buffer 110, such as all or less than all of the cycle current values $I_{CYC}$ stored in the buffer 110 at a given time.

As another example, the current comparator 114 can provide a statistical analysis of an aggregation of a subset of the cycle current values $I_{CYC}$ stored in the current buffer 110. Thus, the current comparator 114 can compare a characteristic of the statistical aggregation of the cycle current values $I_{CYC}$ with the dynamic current threshold 114, such as including the programmable difference current threshold and/or the programmable dynamic amplitude threshold. As an example, the current comparator 114 can analyze a plurality of the cycle current values $I_{CYC}$ stored in the current buffer 110 to provide an aggregate amplitude score that is compared with the dynamic current threshold 116. For example, the aggregate amplitude score can be an average of a plurality of cycle current values $I_{CYC}$ (e.g., less than all of the cycle current values $I_{CYC}$ stored in the current buffer 110) that can be compared with the dynamic current threshold 116. As another example, the aggregate amplitude score can be a median of the plurality of cycle current values $I_{CYC}$, a difference between the first and last cycle current values $I_{CYC}$ in a given sequential range of cycle current values $I_{CYC}$ (e.g., relative to the programmable current difference threshold), a difference between high and low values of a given sequential range of cycle current values $I_{CYC}$ (e.g., such as with one or more extreme values removed), or any of a variety of other statistical manipulations of a set of cycle current values $I_{CYC}$. Therefore, the current comparator 114 can provide a number of different ways of statistically analyzing a sequential set of the cycle current values $I_{CYC}$ with the dynamic current threshold 116 to provide the trigger signal TRG in response to a given comparison condition that is indicative of an overcurrent or a fault condition (e.g., including arc fault conditions).

As yet another example, the current comparator 114 can compare sequential cycle current values $I_{CYC}$ on an individual basis. For example, the current comparator 114 can compare a given one of the cycle current values $I_{CYC}$ with a preceding one of the cycle current values $I_{CYC}$. In this example, if the current comparator determines that the two sequential cycle current values $I_{CYC}$ have a difference that is greater than the programmable current difference threshold relative to the dynamic current threshold 116 (e.g., greater than or less than the dynamic current threshold 116), then the current comparator 116 can provide the trigger signal TRG. Therefore, the current comparator 114 can determine the indication of the overcurrent and/or fault condition in a variety of ways.

As yet another example, the power relay system 100 can be configured to detect a sudden current direction reversal, such as can be indicative of an overcurrent or fault condition. For example, a fault condition can result in the current $I_{PWR}$ through the circuit breaker 102 suddenly reversing direction (e.g., based on an arc fault at one of the power generators 52). However, if the absolute value of the amplitude of the current $I_{PWR}$ does not appreciably change, a typical power relay system could be unable to identify the change in current direction. Therefore, the power relay system 100 can be configured to identify the change in direction of the current $I_{PWR}$ and apply the change in direction in the algorithm for generating the dynamic current threshold 116 and/or the comparison of the cycle current value $I_{CYC}$ with the dynamic current threshold 116.

For example, with respect to the current $I_{PWR}$, the power controller 104 (e.g., via the current sampler 108) can be configured to identify the angle of the sequence of the current $I_{PWR}$. The power controller 104 can measure the impedance angle, such as for a three-phase voltage/current aspect of the current $I_{PWR}$. The sequence angle of the current $I_{PWR}$ can be observed based on a comparison of the current $I_{PWR}$ (e.g., a set of samples for a given cycle of the current $I_{PWR}$) to a predetermined setpoint. As an example, the power controller 104 can identify that, if the sequence angle has changed by more than the predetermined setpoint (e.g., approximately 30 degrees), then the power controller 104 can identify that the current $I_{PWR}$ has changed direction. In response to detecting the reversal of direction of the current $I_{PWR}$, the current comparator 114 can apply the signed amplitude of the cycle current value $I_{CYC}$ in generating the dynamic current threshold 116, thus effecting a large change in the amplitude of the dynamic current threshold 116. As another example, the current comparator 116 can apply the comparison of the signed amplitude of the cycle current value $I_{CYC}$ with the dynamic current threshold 116. Accordingly, the power relay system 100 can identify a reversal in the direction of the current $I_{PWR}$ to identify a potential fault, even when the absolute amplitude of the current $I_{PWR}$ is substantially the same before and after reversal.

As described herein, the current comparator 114 can determine the indication of the overcurrent and/or fault condition (e.g., including arc fault conditions) based on implementing a dynamic current threshold 116. As a result, the instantaneous or time duration comparison of the current $I_{PWR}$ is with respect to a dynamic (potentially fast or slow changing) current threshold, as opposed to a static threshold referenced to zero amps. Accordingly, the current comparator 114 can more accurately identify an overcurrent or fault condition (e.g., including arc fault conditions) to trigger the circuit breaker 102 relative to typical power generator systems that cannot account for changing conditions in the power generator system. As a result, the power relay system 100 can result in a significantly safer environment for performing maintenance on the associated power generator system 50.

For example, and as demonstrated in greater detail in the examples of FIGS. 4-7 herein, a solar power generator system can provide the current $I_{PWR}$ to the POI 56 during the daytime at a given amplitude. However, at night, the current $I_{PWR}$ may flow from the POI 56 to the power generators 52 at a significantly lower amplitude. Therefore, a fault condition of one of the power generators 52 can cause the current $I_{PWR}$ to change in amplitude, but at a lower amplitude than a trip-point of the circuit breaker of a typical power generator system. Thus, a typical power generator system may not detect the fault condition within a short amount of time, or may not be able to rapidly react to the fault condition by tripping the respective circuit breaker. Such a possibility can create a dangerous working environment for maintenance personnel based on an arc flash event occurring over an extended amount of time (e.g., two seconds or more), thus resulting in extremely high incident energy levels (e.g., greater than 60 calories/cm$^2$) at a high arc flash boundary (e.g., greater than thirty feet). As a result, maintenance personnel may be required to wear bulky and uncomfortable personal protective equipment (PPE), similar to a "bomb-suit", to provide maintenance to such typical power generator systems. As an example, the PPE worn by maintenance personnel in a typical power generator system maintenance procedure can include a thick material body suit, a fully enclosed helmet, and thick gloves and boots. Wearing such PPE can be uncomfortable, and much more uncomfortable in warm-weather regions, which may greatly limit an amount of time that personnel can service a maintenance issue before taking a break.

However, by implementing the dynamic current threshold 116, and by implementing one or more of the various different ways of comparing the current $I_{PWR}$ to the dynamic current threshold 116, as described previously, the power relay system 100 can provide for a more rapid and accurate detection of the overcurrent or fault condition (e.g., including arc fault conditions). As a result, the power relay system 100 can provide a more rapid response to the circuit breaker 102 (e.g., less than one-tenth of a second), thus creating a much safer working environment for maintenance personnel. Particularly, by greatly reducing the reaction time to an arc flash event, the incident energy level of the power generator system 50 can be significantly reduced (e.g., to less than ten calories/cm²). Such a safer working environment can result in a significant reduction in an arc flash boundary (e.g., to approximately eleven feet). Additionally, maintenance personnel can safely avoid wearing significant uncomfortable PPE, thus allowing for a significant improvement in comfort and efficacy of the maintenance personnel, particularly in warm climates. By mitigating the necessity of wearing extreme PPE, maintenance personnel can safely and more comfortably provide service to the power generator system 50 for longer durations of time before needing to take a break. Additionally, the power generator system 100 can be resilient to spurious temporary changes in the amplitude of the current $I_{PWR}$, as well as to adiabatic changes to the amplitude of the current $I_{PWR}$ based on the changing dynamic current threshold 116.

Figure 4:
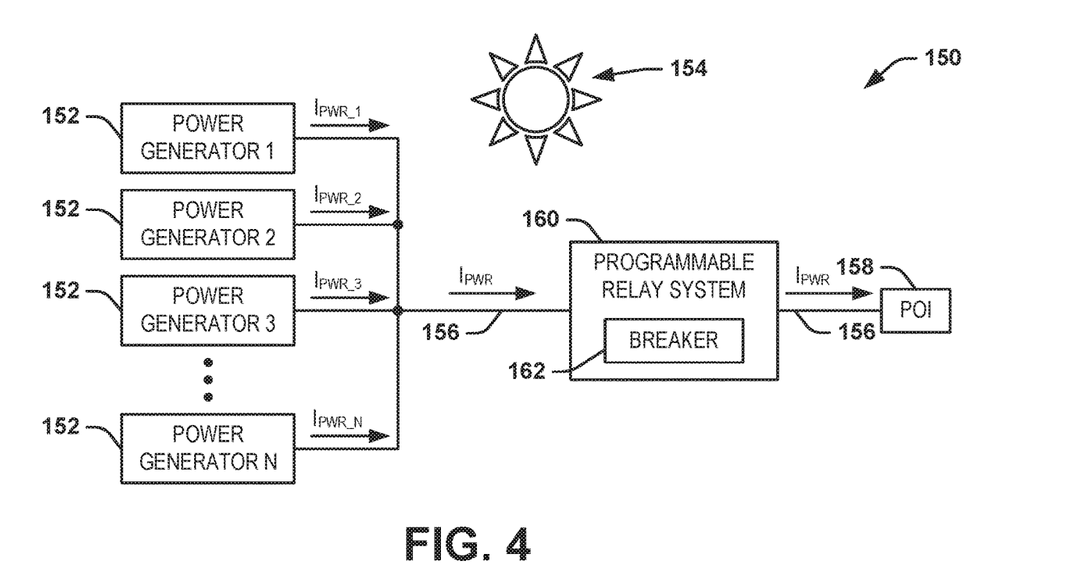
FIG. 4 illustrates an example diagram of a power generator system.

FIG. 4 illustrates an example diagram 150 of a power generator system. The power generator system in the diagram 150 can correspond to a solar power generator system. The power generator system 50 can correspond to one of the power generator system(s) 12 in the example of FIG. 1. Therefore, reference is to be made to the example of FIGS. 1-3 in the following description of the example of FIG. 4.

The power generator system in the diagram 150 includes a plurality N of power generators 152, demonstrated as "POWER GENERATOR 1" through "POWER GENERATOR N", where N is a positive integer. The power generators 152 can each correspond to a set of one or more solar panels. Thus, in the example of FIG. 4, the power generators 152 operate in the daytime (as indicated by the presence of the Sun at 154) to conduct individual currents $I_{PWR\_1}$ through $I_{PWR\_N}$ to a power line 156 on which the current $I_{PWR}$ is provided as a sum of the currents $I_{PWR\_1}$ through $I_{PWR\_N}$. The current $I_{PWR}$ can be provided on the power line 156 to a POI 158, such that the current $I_{PWR}$ can be provided to the public power utility grid as power to be consumed by power customers. The current $I_{PWR}$ can have a relatively high amplitude during normal daytime operation of the power generators 152. For example, for N=6, as an example, each of the currents $I_{PWR\_1}$ through $I_{PWR\_N}$ can have an amplitude of approximately 100 amps, such that the current $I_{PWR}$ has an amplitude of approximately 600 amps. As an example, the power generators 152 can each also include additional supporting equipment, such as inverters, transformers, and/or other equipment (e.g., enclosures).

In the example of FIG. 4, the power generator system in the diagram 150 includes a power relay system 160 that is demonstrated as coupled to the power line 156. As an example, the power relay system 160 can correspond to the power relay system 100 in the example of FIG. 3. The power relay system 160 can be configured to protect the power generators 152, and thus the power generator system in the diagram 150 as a whole, from overcurrent conditions and/or from fault conditions (e.g., including arc fault conditions). The power relay system 160 includes a circuit breaker 162 that is configured to provide an open circuit in the power line 156 in response to being triggered, similar to as described previously.

Figure 5:
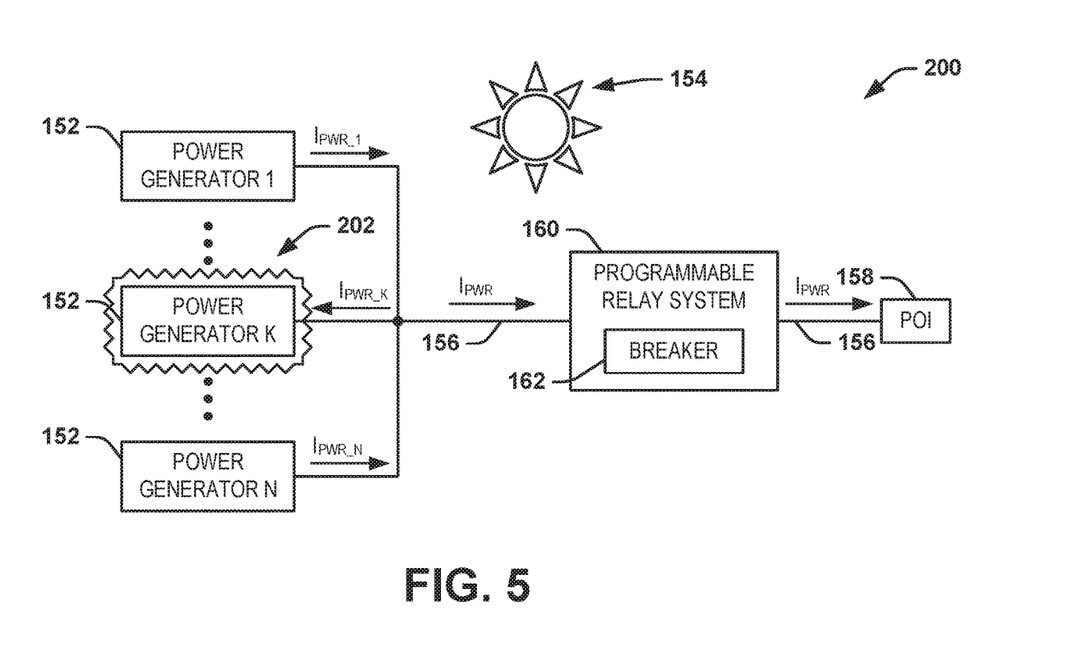
FIG. 5 illustrates another example diagram of a power generator system.

FIG. 5 illustrates another example diagram 200 of the power generator system. The power generator system in the diagram 200 can correspond to the solar power generator system in the example of FIG. 4. Therefore, reference is to be made to the example of FIGS. 1-4 in the following description of the example of FIG. 5.

In the example of FIG. 5, a Kth power generator 152 is demonstrated as having experienced an arc fault event, demonstrated at 202. As a result, while the other power generators 152 are demonstrated as providing the currents $I_{PWR\_1}$ through $I_{PWR\_N}$ to the power line 156, the Kth power generator 152 is drawing current $I_{PWR\_K}$ from the power line 156, such as corresponding to a short-circuit in the Kth power generator 152. As a result, the current $I_{PWR}$ can have a diminished amplitude relative to the normal operation in the diagram 150 in the example of FIG. 4. For example, for N=6, as an example, each of the currents $I_{PWR\_1}$ through $I_{PWR\_N}$ can have an amplitude of approximately 100 amps provided to the power line 156 for normal operation, and the current $I_{PWR\_K}$ can have an amplitude of approximately 200 amps provided from the power line 156, such that the current $I_{PWR}$ has an amplitude of approximately 300 amps.

The amplitude of approximately 300 amps is less than the amplitude of the current $I_{PWR}$ during normal operation of the power generator system, as demonstrated in the example of FIG. 4. Therefore, a typical power relay system may not be able to identify the fault condition that caused a reduction in the amplitude of the current $I_{PWR}$. However, because the difference between the amplitudes of the current $I_{PWR}$ is significant, the power relay system 160 can rapidly detect such a change in amplitude of the current $I_{PWR}$, as described previously, to open the circuit breaker 162 via the trigger signal TRG. Accordingly, the power relay system 160 can rapidly and safely respond to the fault condition that could be undetected by a typical power relay system. As a result, the power relay system 160 can provide for a reduction in incident energy level resulting from arc flash events, along with a reduction in arc flash boundaries. Therefore, the power relay system 160 can allow for minimization of the need for bulky, heavy, and uncomfortable PPE to be worn by maintenance personnel.

Figure 6:
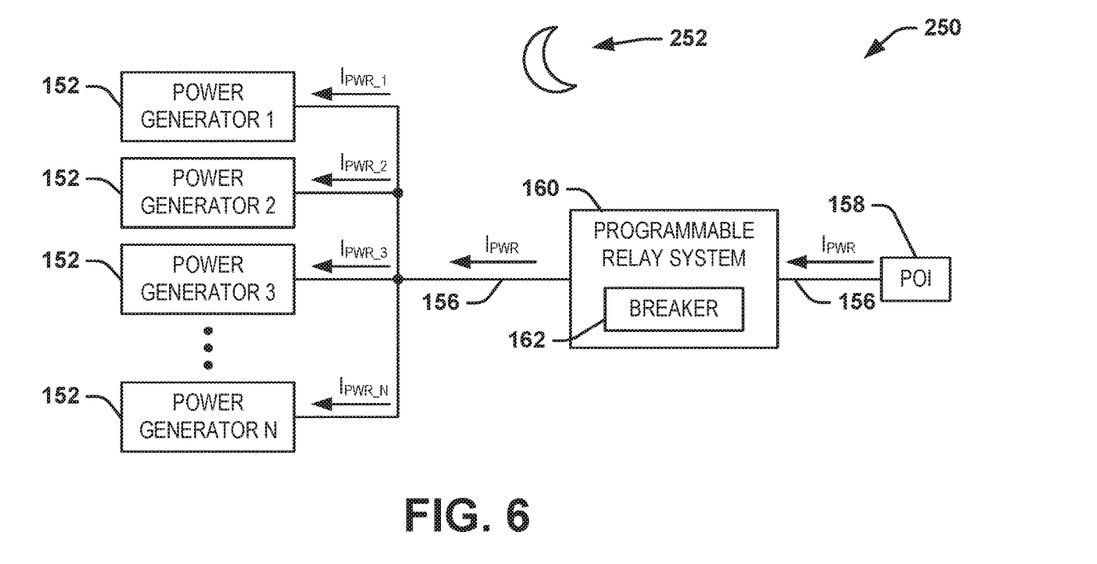
FIG. 6 illustrates another example diagram of a power generator system.

FIG. 6 illustrates another example diagram 250 of the power generator system. The power generator system in the diagram 250 can correspond to the solar power generator system in the example of FIG. 4. Therefore, reference is to be made to the example of FIGS. 1-5 in the following description of the example of FIG. 6.

In the example of FIG. 6, the power generators 152 operate at night (as indicated by the presence of the Moon at 252) to conduct the current $I_{PWR}$ from the power line 156. Particularly, the power generators 152 can consume some small amount of power based on the operation of heaters and other ancillary equipment at night. Therefore, the current $I_{PWR}$ can be provided on the power line 156 from the POI 158, such that the current $I_{PWR}$ can be provided to the power generators 152. For example, for N=6, as an example, each of the currents $I_{PWR\_1}$ through $I_{PWR\_N}$ can have an amplitude of approximately 2 amps provided from the power line 156 for normal operation, such that the current $I_{PWR}$ has an amplitude of approximately 12 amps.

Figure 7:
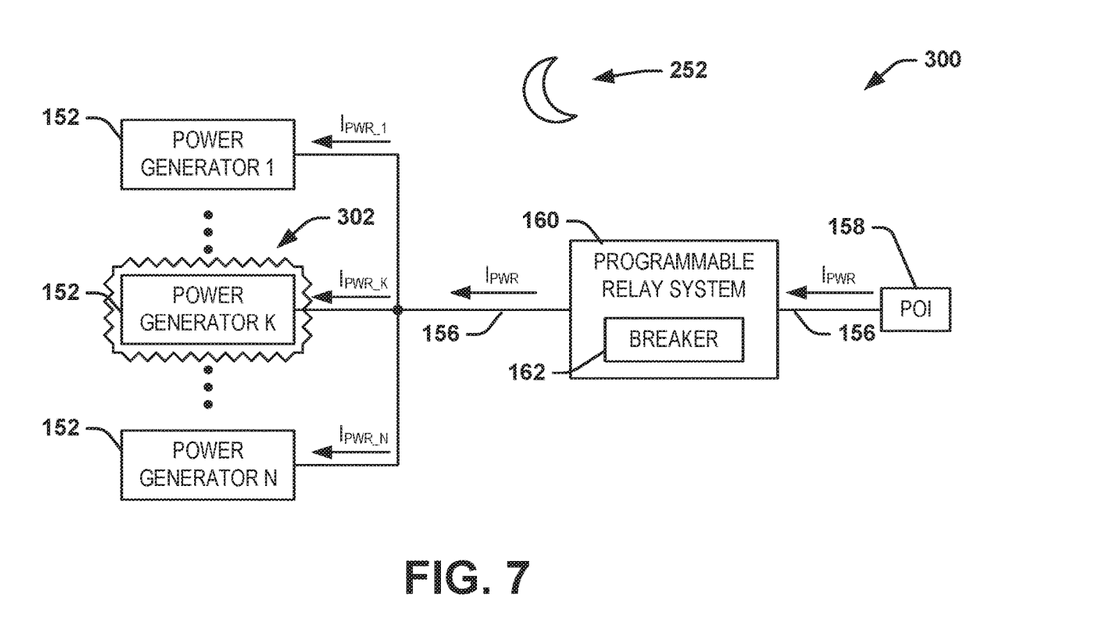
FIG. 7 illustrates another example diagram of a power generator system.

FIG. 7 illustrates another example diagram 300 of the power generator system. The power generator system in the diagram 300 can correspond to the solar power generator system in the example of FIG. 4. Therefore, reference is to be made to the example of FIGS. 1-6 in the following description of the example of FIG. 7.

In the example of FIG. 7, a Kth power generator 152 is demonstrated as having experienced a fault event, demonstrated at 302. As a result, while the other power generators 152 are drawing the currents $I_{PWR\_1}$ through $I_{PWR\_N}$ from the power line 156 at a lower relative amplitude, the Kth power generator 152 is drawing current $I_{PWR\_K}$ from the power line 156 at a significantly higher amplitude (e.g., approximately 200 amps), such as corresponding to a short-circuit in the Kth power generator 152. As a result, the current $I_{PWR}$ can have a diminished amplitude relative to the normal operation in the diagram 150 in the example of FIG. 4, but greater than the nighttime operation in the example of FIG. 6. For example, for N=6, as an example, each of the currents $I_{PWR\_1}$ through $I_{PWR\_N}$ can have an amplitude of approximately 2 amps provided from the power line 156 for normal operation, and the current $I_{PWR\_K}$ can have an amplitude of approximately 200 amps provided from the power line 156, such that the current $I_{PWR}$ has an amplitude of approximately 210 amps.

The amplitude of approximately 210 amps is less than the amplitude of the current $I_{PWR}$ during normal operation of the power generator system during the daytime, as demonstrated in the example of FIG. 4. Therefore, a typical power relay system may not be able to identify the fault condition that caused a reduction in the amplitude of the current $I_{PWR}$. However, because the difference between the amplitudes of the current $I_{PWR}$ is significant, the power relay system 160 can rapidly detect such a change in amplitude of the current $I_{PWR}$, as described previously, to open the circuit breaker 162 via the trigger signal TRG. Accordingly, the power relay system 160 can rapidly and safely respond to the fault condition that could be undetected by a typical power relay system. As a result, the power relay system 160 can provide for a reduction in incident energy level resulting from arc flash events, along with a reduction in arc flash boundaries. Therefore, the power relay system 160 can allow for minimization of the need for bulky, heavy, and uncomfortable PPE to be worn by maintenance personnel.

Figure 8:
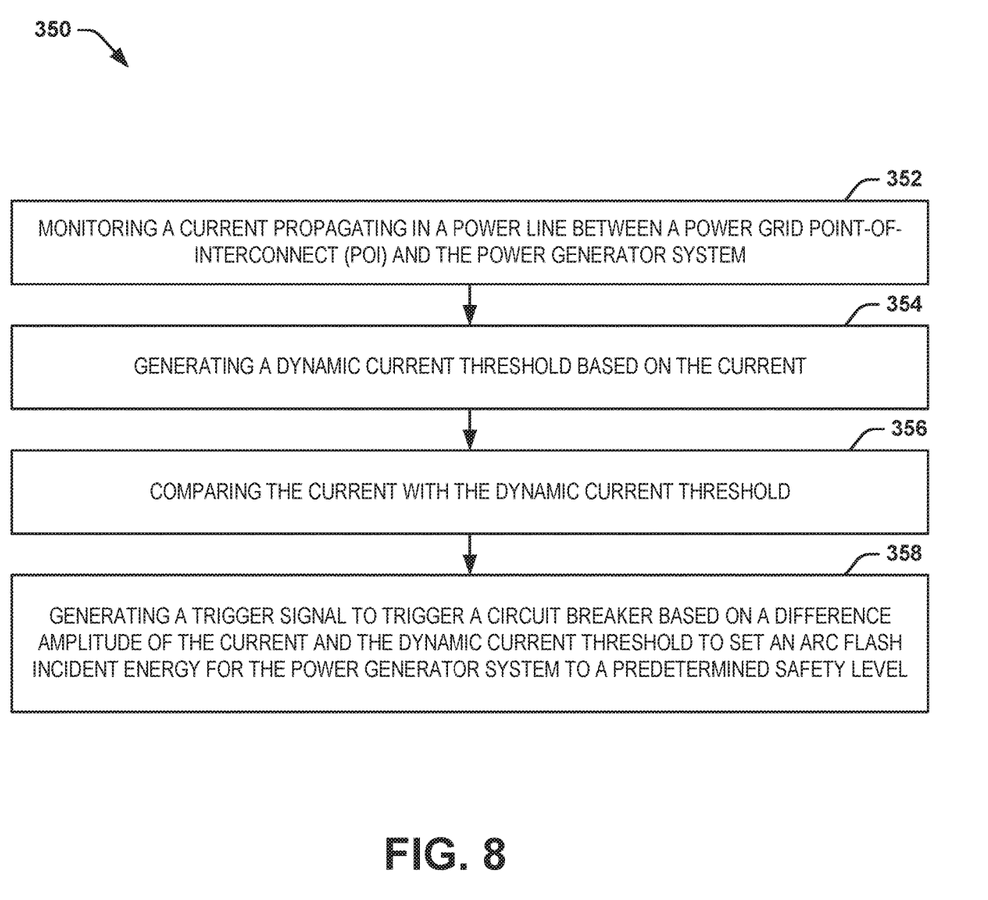
FIG. 8 illustrates an example of a method for protecting a power generator system.

In view of the foregoing structural and functional features described above, methods in accordance with various aspects of the present disclosure will be better appreciated with reference to FIG. 8. While, for purposes of simplicity of explanation, the method of FIG. 8 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 8 illustrates a method 350 for protecting a power generator system (e.g., the power generator system 50). At 352, a current (e.g., the current $I_{PWR}$) propagating in a power line (e.g., the power line 54) between a power grid POI (e.g., the POI 56) and the power generator system is monitored. At 354, a dynamic current threshold (e.g., the dynamic current threshold 116) is generated based on the current. At 356, the current is compared with the dynamic current threshold. At 358, a trigger signal (e.g., the trigger signal TRG) is provided to trigger a circuit breaker (e.g., the circuit breaker 60) based on the plurality of sequential cycle current values relative to the dynamic current threshold.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power relay system comprising:
   a circuit breaker configured, when triggered, to provide an open circuit in a power line configured to conduct a current between a power grid point-of-interconnect (POI) and a power generator system; and
   a power controller configured to monitor the current and to generate a dynamic current threshold based on the current, the power controller being further configured to compare the current with the dynamic current threshold and to trigger the circuit breaker based on a difference of the current relative to the dynamic current threshold to set an arc flash incident energy level of the power generator system at or below a predetermined safety level.

2. The system of claim 1, wherein the power controller is configured to generate a cycle current value associated with an amplitude of the current, the power controller being configured to generate the dynamic current threshold based on the cycle current value at each of a plurality of cycles of the current, and is further configured to trigger the circuit breaker based on a difference of the cycle current value relative to the dynamic current threshold.

3. The system of claim 2, wherein the power controller comprises:
   a current sampler configured to sample the current to generate a plurality of current samples and to generate the cycle current value for each of the plurality of cycles based on the plurality of current samples associated with each respective one of the plurality of cycles; and
   a current buffer configured to continuously store a predetermined number of cycle current values in a time-wise manner, the dynamic current threshold being generated based on the predetermined number of cycle current values.

4. The system of claim 2, wherein the power controller comprises an averaging component configured to substantially continuously average the cycle current value associated with a predetermined number of the plurality of cycles of the current to generate the dynamic current threshold.

5. The system of claim 2, wherein the power controller further comprises a current comparator configured to compare the cycle current value of at least one of the plurality of cycles of the current and to trigger the circuit breaker based on the amplitude of the cycle current value of the at least one of the plurality of cycles relative to the dynamic current threshold.

6. The system of claim 5, wherein the current comparator is configured to compare a statistical aggregation of a programmable number of sequential cycle current values with the dynamic current threshold to trigger the circuit breaker in response to the statistical aggregation of the programmable number of sequential cycle current values differing from the dynamic current threshold by greater than a programmable threshold current change.

7. The system of claim 5, wherein the current comparator is configured to compare the at least one of the plurality of cycles with the dynamic current threshold to trigger the circuit breaker in response to the at least one of the plurality of cycles differing from the dynamic current threshold by greater than a programmable threshold current change.

8. The system of claim 5, wherein the current comparator is configured to compare the cycle current value with the dynamic current threshold to trigger the circuit breaker in response to the cycle current value differing from the dynamic current threshold by greater than a programmable threshold current change within a programmable duration of time.

9. The system of claim 5, wherein the current comparator is configured to compare the cycle current value with the dynamic current threshold to trigger the circuit breaker in response to the cycle current value decreasing less than the dynamic current threshold by greater than a programmable threshold current change.

10. The system of claim 5, wherein the current comparator is configured to identify a change in direction of the current based on a phase angle of the current, and is further configured to apply a signed amplitude of the current to at least one of the generation of the dynamic current threshold and the comparison of the cycle current value with the dynamic current threshold.

11. A method for protecting a power generator system, the method comprising:
monitoring a current propagating in a power line between a power grid point-of-interconnect (POI) and the power generator system;
generating a dynamic current threshold based on the current;
comparing the current with the dynamic current threshold; and
generating a trigger signal to trigger a circuit breaker based on a difference of the current relative to the dynamic current threshold to set an arc flash incident energy level of the power generator system at or below a predetermined safety level.

12. The method of claim 11, wherein monitoring the current comprises:
sampling the current in each cycle of the current; and
generating a cycle current value corresponding to a plurality of samples of the current for each cycle of the current;
wherein comparing the current comprises comparing the cycle current value with the dynamic current threshold.

13. The method of claim 12, wherein generating the dynamic current threshold comprises substantially continuously averaging a predetermined number of cycle current values to generate the dynamic current threshold.

14. The method of claim 12, wherein comparing the cycle current value comprises comparing one of a plurality of sequential cycle current values with a previous one of the sequential cycle current values, wherein generating the trigger signal comprises generating the trigger signal in response to the respective one of the sequential cycle current values differing from the previous one of the sequential cycle current values by greater than a programmable threshold current change value relative to the dynamic current threshold.

15. The method of claim 12, wherein comparing the cycle current value comprises comparing a programmable number of sequential cycle current values with the dynamic current threshold, wherein generating the trigger signal comprises generating the trigger signal in response to each of the programmable number of sequential cycle current values differing from a programmable threshold current change value relative to the dynamic current threshold.

16. The method of claim 12, further comprising generating a statistical aggregation of a programmable number of sequential cycle current values, wherein comparing the plurality of sequential cycle current values comprises comparing the statistical aggregation with the dynamic current threshold, wherein generating the trigger signal comprises generating the trigger signal based on the statistical aggregation relative to the dynamic current threshold.

17. The method of claim 12, wherein generating the trigger signal comprises generating the trigger signal in response to the cycle current value decreasing less than a programmable threshold current change value relative to the dynamic current threshold.

18. The method of claim 11, further comprising maintaining the power generator system via personnel wherein the personnel maintain the power generator system without at least a portion of personal protective equipment (PPE) that is rated for incident energy levels of greater than 10 calories/cm$^2$ due to the arc flash incident energy level being set to at or below 10 calories/cm$^2$.

19. The method of claim 18, wherein the maintaining the power generator system via the personnel comprises maintaining the power generator system via the personnel without at least one of a body suit, a helmet, and gloves.

20. The method of claim 11, wherein generating the trigger signal comprises generating the trigger signal to trigger the circuit breaker to set the arc flash incident energy level to at or below 10 calories/cm$^2$.

21. A power relay system comprising:
a circuit breaker configured, when triggered, to provide an open circuit in a power line configured to conduct a current between a power grid point-of-interconnect (POI) and a power generator system; and
a power controller comprising:
a current sampler configured to sample the current in each cycle of the current to generate a plurality of current samples for each cycle of the current, and to generate a cycle current value for each cycle of the current based on the plurality of current samples associated with the respective cycle of the current;
a current buffer configured to continuously store a predetermined number of cycle current values in a time-wise manner;
an averaging component configured to substantially continuously average the predetermined number of cycle current values to generate a dynamic current threshold; and
a current comparator configured to compare the cycle current value associated with at least one of the plurality of cycles with the dynamic current threshold and to trigger the circuit breaker based on an amplitude difference of the cycle current relative to the dynamic currernt threshold to set an arc flash incident energy level of the power generator system at or below a predetermined safety level.

22. The system of claim 21, wherein the current comparator is configured to compare the cycle current value with the dynamic current threshold to trigger the circuit breaker in response to the cycle current value differing from the dynamic current threshold by greater than a programmable threshold current change within a programmable duration of time.

* * * * *